US006738768B1

(12) United States Patent
Johnson

(10) Patent No.: US 6,738,768 B1
(45) Date of Patent: May 18, 2004

(54) SYSTEM AND METHOD FOR EFFICIENT INFORMATION CAPTURE

(76) Inventor: William J. Johnson, 1704 Katherine Ct., Flower Mound, TX (US) 75022

( * ) Notice: Subject to any disclaimer, the term of this patent is extended or adjusted under 35 U.S.C. 154(b) by 355 days.

(21) Appl. No.: 09/604,026

(22) Filed: Jun. 27, 2000

(51) Int. Cl.[7] .............................................. G06F 17/30
(52) U.S. Cl. .............................. 707/7; 707/2; 707/101; 707/104; 707/200; 707/204; 709/224
(58) Field of Search ................................ 707/2, 7, 101, 707/104, 100, 200, 204; 705/5; 725/50; 709/224

(56) References Cited

U.S. PATENT DOCUMENTS

| | | | | |
|---|---|---|---|---|
| 5,680,611 A | * | 10/1997 | Rail et al. | 707/101 |
| 5,765,165 A | * | 6/1998 | Harper | 707/104 |
| 5,799,302 A | * | 8/1998 | Johnson et al. | 707/7 |
| 5,933,810 A | * | 8/1999 | Okawa | 705/5 |
| 6,199,058 B1 | * | 3/2001 | Wong et al. | 707/2 |
| 6,209,131 B1 | * | 3/2001 | Kim et al. | 725/50 |
| 6,237,035 B1 | * | 5/2001 | Himmel et al. | 709/224 |

* cited by examiner

Primary Examiner—Diane D. Mizrahi
Assistant Examiner—Thuy Pardo
(74) Attorney, Agent, or Firm—Law Office of Tim Cook P.C.

(57) ABSTRACT

Provided is a system and method for enabling a user to efficiently capture information from a data processing system user interface. A user performs information capture actions such as browsing user interface contexts, printing information, downloading information, clipping information to a clipboard, saving information, creating shortcuts, or other information capture actions. The user's data processing system use is monitored for information capture actions. Upon user invocation of a monitored information capture action, determination is automatically made if the action is redundant. If the information capture action is determined to be redundant, then a configurable alert is provided to the user. If the information capture action is determined to not be redundant, then the information capture action is permitted to continue.

17 Claims, 9 Drawing Sheets

SYSTEM AND METHOD FOR EFFICIENT INFORMATION CAPTURE

FIELD OF THE INVENTION

The present invention relates generally to efficiently capturing information from data processing system user interfaces, and more particularly, to automatically preventing redundant information capture actions from data processing system user interfaces (e.g. preventing redundant browsing, printing, clipping, downloading, creating of shortcuts, or other information capture actions).

BACKGROUND OF THE INVENTION

Internet connectivity has quickly become a tool for researching all kinds of information. Many people use the internet in place of encyclopedias and other hard copy sources of information. The internet is growing explosively with abundance of information, and provides open access of the information. The same links, or same documents, are often referenced from different web sites. One browser method for automatically indicating to a user that the link has already been visited is to highlight the link in a different color. However, the links of referencing pages are highlighted rather than notifying the user when a previously visited page is in focus. Only the referencing pages have highlighted links. Web browsers, for example the Microsoft Internet Explorer (Microsoft and Internet Explorer are trademarks of Microsoft corporation) or the Netscape Navigator (Netscape and Navigator are registered trademarks of Netscape corporation, now owned by America Online (America Online is a trademark of American Online corporation)), maintain history information of which web site/page address (i.e. Uniform Resource,Locator (URL) address) the user has transposed to. This enables highlighting links containing matching addresses. In the case of the Microsoft Internet Explorer, the history information also enables users to browse previously visited addresses, add previously visited addresses to a "Favorites" folder, or transpose to a previously visited address with a simple mouse invocation. The history information is a useable record of where the user has been. There is no method of using the history information for automatic detection of redundancy in print actions, download actions, clipboard actions, save actions, short cut actions, or visit actions when the visited page is to be focused. The "Favorites" folder maintains short cuts to visited addresses for convenient future selection to transpose to the address. The Microsoft Internet Explorer does detect a duplicate short cut creation action if a duplicate is found in the "Favorites" folder, but this duplicate detection is only upon interfacing directly with the "Favorites" folder interface, and is not a system wide or even application wide implementation, for example, to copy short cuts to another folder (but of the scope of "Favorites"), or to the user's desktop. The history information is not used at all for the duplicate detection. Presence in the "Favorites" folder dictates duplication. Right mouse click repeatedly on the same web address page for a short cut copy to a user's desktop, and the short cut will be copied multiple times without any redundancy notification processing.

Also, if a user prints one or more pages of interest, there is no method for conveniently indicating that the page(s) were printed. Having such an indication would prevent the user from redundantly printing the page(s) again. Relying on human memory after printing many pages from different web sites may be difficult. While the user may browse history information of web pages visited, it is tedious to figure out what was printed from which of the web pages.

A user who surfs the internet may also right mouse click on an image to save a local copy of the image file. There is no convenient method for knowing if the image has already been saved should a user save many image files. Currently, the image file name uniqueness in a specified target directory is all that allows detecting redundancy. If the user puts the image file in another directory, or different web sites use the same file name for different files, then file name uniqueness does not provide an adequate redundancy check when the user goes to save the file.

A user may clip information from a current user interface context. The information can then be printed, pasted to a saved file, or used as the user sees fit to use the captured information. The user may be faced with determining whether or not the information has been previously clipped and used. An automated method is needed for determining if clips are redundant.

A user may also choose to download a file such as an executable program, zip file, documentation file, video file, audio file, or any other file for download from the internet. There needs to be a method for determining redundancy while minimizing user interface actions. Manually browsing history information, or logs, through other options in the user interface is inconvenient. It is desirable to notify the user of a redundant information capture action automatically upon the user performing the, action. Preventing the user from manually browsing external historical information sources is desirable.

Users also create short cuts to web sites and place them on their desktop or in certain folders. A method is needed for eliminating the problem of accidentally creating multiple short cuts to the same place, program, or file.

Thus, information capture actions include browsing information in user interface contexts (e.g. web page visits), printing information, downloading information, clipboard clipping information, saving information, copying shortcuts to information, or other information capture actions. Information capture actions all have the same objective of capturing information for the user. For user interface efficiency, and for maximizing productivity, information capture actions need an associated convenient automated method for alerting the user when a redundant action is taking place.

SUMMARY OF THE INVENTION

The present invention is a system and method for enabling a user to efficiently capture information from a data processing system user interface. A user performs information capture actions (ICAs) such as browsing user interfaces (e.g. internet web site/page visits), printing information, downloading information, clipping information to a clipboard, saving information, creating shortcuts, or other information capture actions. The user's data processing system use is monitored for information capture actions (ICAs) according to configurable tracking variables. Upon user invocation of a monitored information capture action (ICA), determination is atomically made if the action is redundant. If the information capture action (ICA) is determined to be redundant (i.e. repeated), then a configurable alert is provided to the user. If the information capture action is determined to not be redundant, then the information capture action is permitted to continue and proceeds in the conventional manner.

In the preferred embodiment, ICAs are maintained to redundancy determination history information (RDHI). A user invoked ICA is automatically compared to the previously performed ICAs maintained in the redundancy determination history information (RDHI). If a match is found, then the ICA is determined to be redundant. A match is configurably determined by the ICA being equivalent to a previously performed ICA, a subset to a previously performed ICA, or a superset to a previously performed ICA. An alert provided is user configurable for including an audible notification with automatic cancellation of the ICA, a visual notification with automatic cancellation of the ICA, or a prompt with user reconciliation required. User configurable tracking variables enable, or disable, which ICAs are to be monitored. The user also has full control over managing RDHI for enabling/disabling the historical collection of ICAs, saving RDHI to a file, setting RDHI from a file, or clearing history.

It is one advantage of the present invention in enabling a user to very quickly capture information from a data processing system user interface while at the same time eliminating redundant information captures. For example, a user surfs the internet for a subject matter and prints out web pages, and references thereof, that are desirable. Often, the same material is linked from different web sites, or different contexts from the same web site. The user may not remember if a document was already printed. The present invention automatically notifies the user when the document has already been printed so the user will prevent repeating the print.

Another advantage of the present invention is that an ICA can be made non-repeatable so that a user is not forced to rely on human memory for whether or not the action was already performed. Information capture actions of a user include browsing user interfaces contexts, printing information (e.g. documents, web pages, or the like), downloading information (e.g. files, executables, pictures, videos, or the like), clipping information (text, windows, graphics, application controls, or combinations thereof) to a clipboard, saving information, creating shortcuts, or other like ICAs.

A further advantage of the present invention is that RDHI collected for invoked ICAs can be configured by a user for any historical time window of ICAS. The user may save RDHI to a user named file for later use. The user may replace the active RDHI with a previously saved RDHI file. The user may append previously saved RDHI to the active RDHI. The user may also clear the active RDHI. Thus, the user is able to affect redundancy determination functionality by managing RDHI of ICAs. Also, the RDHI is a separate entity maintained outside ICA processing so that a system wide implementation is provided.

Yet another advantage of the present invention is that any, or all, ICAs are user configurable for being tracked to automatically determine redundancy. The user controls which types of ICAs to monitor, when to monitor ICAs, and how to monitor lCAs for redundancy.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE FIGURES

The present invention will be described with reference to the accompanying drawings, wherein.

DETAILED DESCRIPTION OF THE PREFERRED EMBODIMENTS

With reference now to detail of the drawings, the present invention is described. Obvious error handling is omitted from the flowcharts in order to focus on the key aspects of the present invention.

Figure 1:
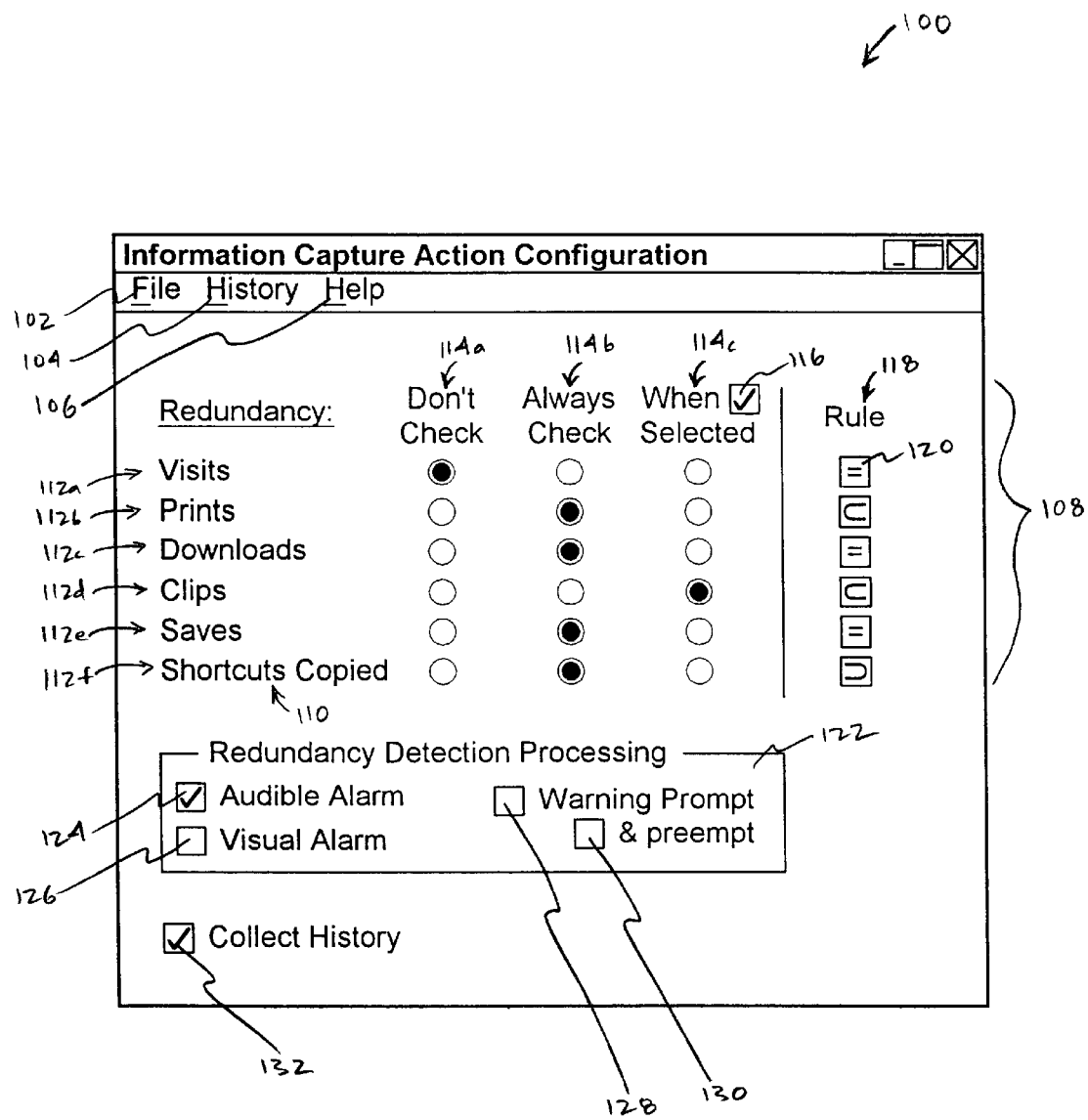
FIG. 1 depicts a preferred embodiment of an information capture action configuration window according to the present invention.

FIG. 1 depicts a preferred embodiment of an information capture action configuration window according to the present invention. An information capture action (ICA) configuration window 100 provides one embodiment for maintaining ICA configurations according to the present invention. While FIG. 1 depicts a window as may be seen on a data processing system that runs a graphical user interface, other data processing systems such as wireless telephones, Personal Digital Assistants (PDAs), or any other data processing system device may incorporate a different user interface with functionality that does not depart from the spirit and scope of the present invention. ICA configuration window 100 includes a File pulldown option 102 which contains a selectable text list of "Alarms" for configuring the alarms of the present invention, and "Exit" for exiting the ICA configuration window 100. Pulldowns are as is conventional in a windowed system. History pulldown option 104 contains a selectable text list of "Browse" for browsing RDHI of the present invention, "Clear" for clearing RDHI, "Set" for setting RDHI to a saved history file, "Append" for appending a saved history file to the active RDHI, "Save" for saving RDHI to a file, and "Pruning" for configuring variables that govern pruning of the RDHI.

The ICA configuration window 100 further includes a Help pulldown option 106, title bar, and other features typical of conventional windows. ICA configuration window 100 interfaces with the user in the conventional manner as well known to those skilled in the art. User invocation of the <F1> key over a particular area on the window will provide context sensitive help to the particular area, as is implemented by many conventional user interfaces. ICA configuration window 100 further includes an ICA settings section 108 that includes a row by column matrix of settings. An information capture actions (ICAs) column 110 identifies the configurable ICAs for the particular data processing system which are each shown generally as ICA rows 112. Different data processing system may have different information capture actions (ICAs). Tracking variable columns 114 (shown generally as columns 114) are mutually exclusive such that one radio button is permitted for an ICA row 112. Column 114a indicates to not check for ICA redundancy (i.e. not track) so that the ICA is processed as in conventional data processing systems, for example, as in the case of the ICA row 112a configuration. Column 114b indicates to always check for redundancy (i.e. always track) of the ICA as processed in the present invention, for example, as in the case of ICA row 112b. Column 114c indicates to only check for redundancy of the ICA when the checkmark box 116 contains a checkmark (i.e. track when checkmark box 116 indicates to track), for example, as in the case of ICA row 112d. Checkmark box 116 allows enabling or disabling all ICA rows with a radio button in column 114c. Columns 114 (114a–114c) and checkmark box 116 form configurable tracking variables for whether or not to monitor ICAs. ICA settings section 108 further includes a rule column 118 for configuring a rule of ICA rows 112. The rule is only meaningful when an ICA is set for being tracked through column 114b, or 114c when checkmark box 116 is marked with a checkmark. Eligible settings for a rule, for example in a rule box 120, comprise a meaningful character denoting equality (=), subset (⊂), superset (⊃), or both (Ω). In one use, the user simply invokes up or down arrow keys to toggle through the eligible characters displayed in a rule box, for example, rule box 120. Equality implies that an ICA is determined to be redundant when its action is identical (i.e. equivalent) to a previously performed ICA. Subset implies that an ICA is determined to be redundant when its action is a subset of (within the scope of, or equivalent to) a previously performed ICA. Superset implies that an ICA is determined to be redundant when its action is a superset of (contains the scope of, or is equivalent to) a previously performed ICA. Both implies that an ICA is determined to be redundant when its action is a superset or a subset of a previously performed ICA.

For example, a visit ICA may have to do with web site page visits in a web browser. If ICA row 112a was marked for being tracked, the equality rule of rule box 120 indicates that the visit ICA (ICA row 112a) is only redundant when a web page is visited that was previously visited (i.e. web page reference equivalent (e.g. "http://www.domain.com/path1/path2/page.html" is equivalent to "http://www.domain.com/path1/path2/page.html")). Other user interfaces will use a similar reference provided there is unique information describing the visited user interface context. Redundancy is determined when transposition to the identical user interface context is invoked. As discussed below, a web browser BACK or FWD context invocation by a user is not considered in redundancy processing. These types of invocations by a user are inconsequential.

A subset rule may also be assigned, for example, to the print ICA (ICA row 112b). In the web browser example, a user may want to print out web pages that are visited, or documents referred to by web pages. The user wants to ensure the same information is not printed out more than once as he navigates the world wide web over a long period of time in search of useful hard copy documentation. The subset option says to treat a print ICA as redundant when the print action (ICA) is a subset of a previously performed print action (ICA of same type). For example, the user may have already printed pages 50 through 100 of a document and later attempts to print pages 75 through 100. Pages 75 through 100 is a subset of pages 50 through 100. Thus, the present invention automatically determines if the information to be printed is a subset of that which was already printed, thereby making the current print action wasteful. The user does not have to rely on his memory.

In another example, a superset rule may also be assigned, for example, to the shortcuts copied ICA (ICA row 112f). In the web browser example, a user may want to create shortcuts on his desktop, or in a folder, for convenient invocation to a particular web page, but he wants to capture shortcuts to the detailed information of a particular web page, and not clutter his system with higher level web site addresses that contain the web page. The superset option says to treat a shortcut copy action (an ICA) as redundant when it is a superset of a previously performed shortcut copy action (ICA of same type). "http://www.domain.com/path1" is a superset to "http://www.domain.com/path1/path2/page.html". Thus, the present invention automatically determines if the shortcut created is unnecessary because a deeper level of web page context already has a shortcut created for it.

Finally, the both rule indicates that an ICA will be treated as redundant when an ICA is a superset to, or subset of, a previously performed ICA of the same type. As will be discussed below, rules affect the redundancy determination that is made by considering an ICA reference, for example, a web page address path, file path, or the like. Further considered, when appropriate, is bounds descriptor information for example which pages were actually printed, what information was actually clipped from the user interface, etc.

ICA configuration window 100 also includes a redundancy detection processing control group 122. Control group 122 contains an audible alarm setting 124 for enabling an audible alarm upon determining redundancy, a visual alarm setting 126 for enabling a visual alarm upon determining redundancy, a warning prompt setting 128 for enabling a pop-up warning, and a preempt option 130 to the warning prompt setting 128 for specifying whether the pop-up warning should preempt all data processing system use until reconciled (or acknowledged) by the user. A checkmark placed for the preempt option 130 automatically populates a checkmark to the warning prompt setting 128. The absence of a checkmark for the warning prompt setting 128 causes a graying out of the preempt option 130. The redundancy detection processing control group 122 is used to manage how the present invention should behave upon recognition of a redundant ICA specified for monitor through tracking variable columns 114.

ICA configuration window 100 also includes a history collection setting 132 for enabling collection of ICAs to RDHI. In all window 100 discussions, a checkmark present indicates enabled and the absence of a checkmark indicates disabled. Keystroke(s) (e.g. hot-keys), mouse use, or other input peripherals will also appropriately operate window 100 as well known in the art.

In some present invention embodiments, a rule column 118 may not be provided. In such embodiments, equality is the only rule for detecting redundancy.

Figure 2:
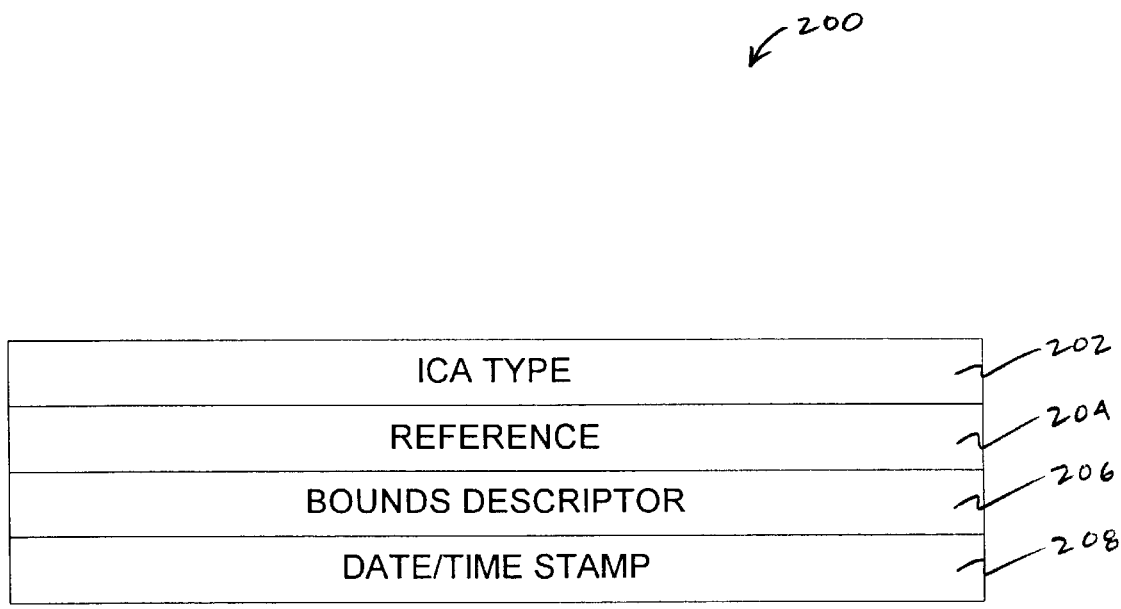
FIG. 2 depicts a preferred embodiment of a redundancy determination history information data record according to the present invention.

FIG. 2 depicts a preferred embodiment of a redundancy determination history information data record according to the present invention. The RDHI data record 200 contains fields as shown. An ICA type field 202 indicates the type, of ICA of the data processing system, for example, a download action (an ICA). ICA field 202 will contain a value from a set of the candidate ICA types that can be performed on the data processing -system executing the present invention. FIG. 1 demonstrated six different ICA types. A reference field 204 contains the ICA reference. ICA references include, and are not limited to, fully qualified web page addresses, fully qualified web site file repositories, fully qualified document location (e.g. File Transfer Protocol (FTP) address), fully qualified system file path name, or some other unique contextual information describing the ICA for the ICA type. A bounds descriptor field 206 contains bounds information that may be applicable to various ICA types. Bounds information includes, and is not limited to, document page numbers, file offset and length of content, or other information that may further add detail to the reference field 204. A date/time stamp field 208 contains a date/time stamp of when the ICA was performed to facilitate pruning by date/time. Pruning may also be accomplished by the number (a depth configuration through History pulldown option 104 Pruning selection) of data records 200 maintained in RDHI. Depending on the embodiment, RDHI data records 200 may be maintained in a file of records, or in a database table with columns for fields.

Figure 3:
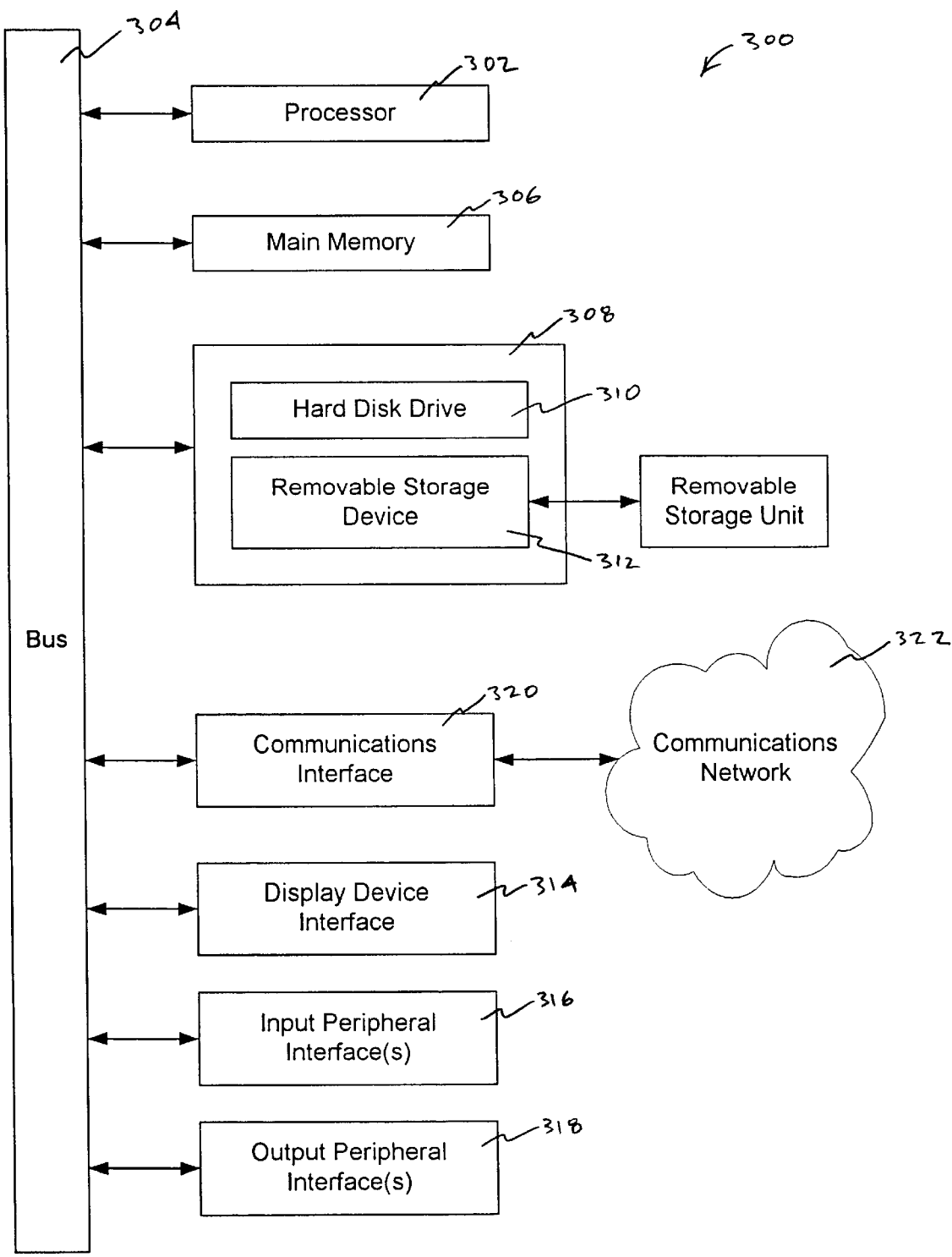
FIG. 3 depicts a block diagram of a data processing system useful for implementing data processing system aspects of the present invention.

FIG. 3 depicts a block diagram of a data processing system useful for implementing data processing system aspects of the present invention. A data processing system 300 according to the present invention includes at least one processor 302 coupled to a bus 304. The data processing system 300 also includes main memory 306, for example, random access memory (RAM). Optionally, the data processing system 300 may include secondary storage devices 308 such as a hard disk drive 310, and/or removable storage device 312 such as a compact disk, floppy diskette, or the like, also connected to bus 304. In one embodiment, secondary storage devices could be remote to the data processing system 300 and coupled through an appropriate communications interface.

The data processing system 300 may also include a display device interface 314 for driving a connected display device (not shown). The data processing system 300 may further include one or more input peripheral interface(s) 316 to input devices such as a keyboard, telephone keypad, Personal Digital Assistant (PDA) writing implements, mouse, voice interface, or the like. User actions, for example ICAs, to the data processing system are inputs accepted by the input peripheral interface(s) 316. The data processing system 300 may still further include one or more output peripheral interface(s) 318 to output devices such as a printer, facsimile device, or the like.

Data processing system 300 will include a communications interface 320 for connecting data processing system 300 to an other data processing system via communications network 322 over a communications connection managed over analog signal waves, digital signal waves, copper wire, optical fiber, or the like.

Data processing system programs (also called control logic) may be completely inherent in the processor 302 being a customized semiconductor, or may be stored in main memory 306 for execution by processor 302 as the result of a read-only memory (ROM) load (not shown), or may be loaded from a secondary storage device into main memory 306 for execution by processor 302. Such programs, when executed, enable the data processing system 300 to perform features of the present invention as discussed herein. Accordingly, such data processing system programs represent controllers of the data processing system.

In one embodiment, the invention is directed to a control logic program product comprising a processor 302 readable medium having control logic (software) stored therein. The control logic, when executed by processor 302, causes the processor 302 to perform functions of the invention as described herein.

In another embodiment, the invention is implemented primarily in hardware, for example, using a prefabricated component state machine (or multiple state machines) in a semiconductor element such as processor 302.

Those skilled in the art will appreciate various modifications to the data processing system 300 without departing from the spirit and scope of the invention.

Figure 4A:
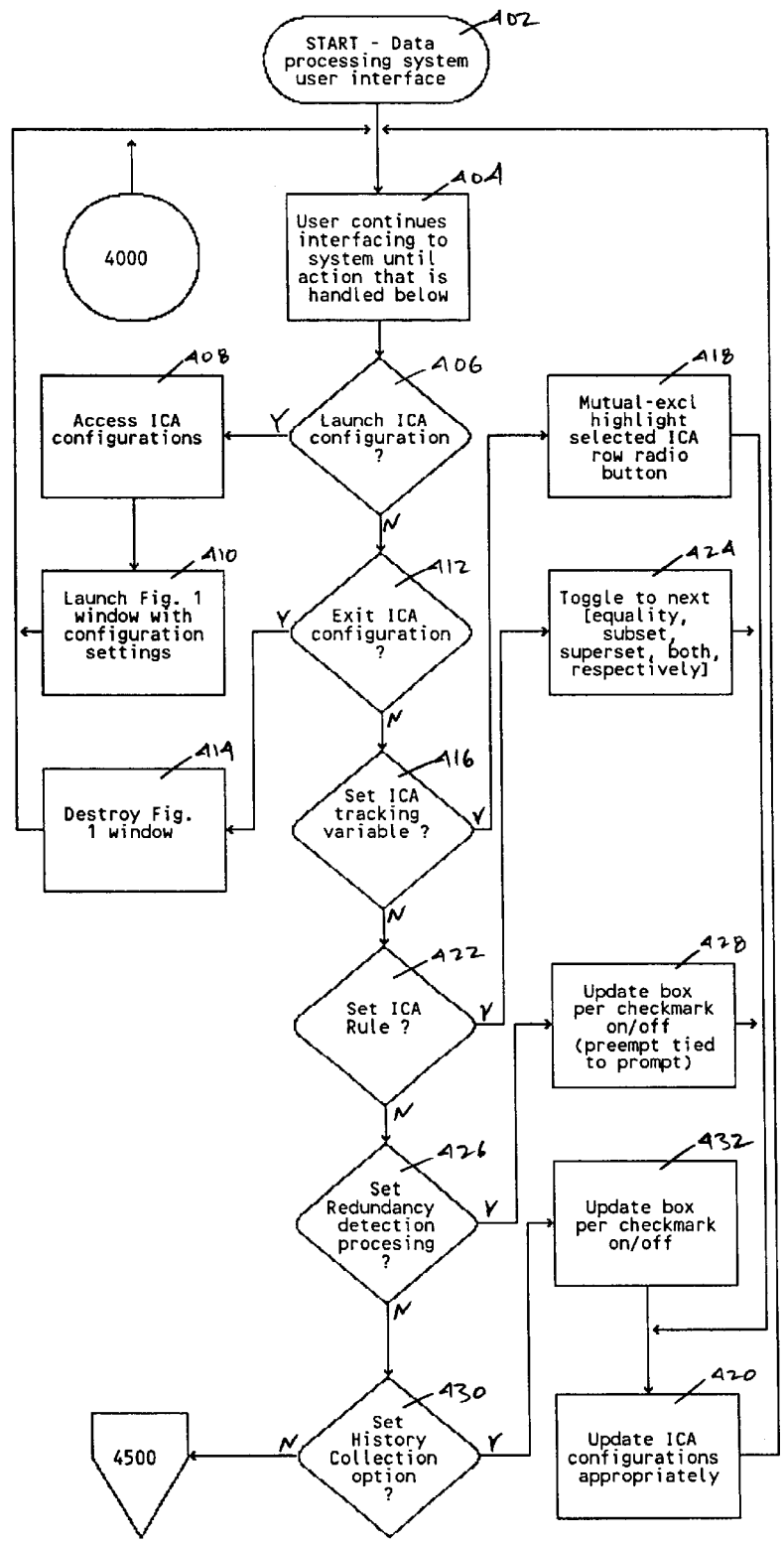
FIG. 4A and FIG. 4b depict flowcharts for describing a preferred embodiment of the data processing system use aspects of the present invention, in particular the information capture action configuration aspects.
Figure 4B:
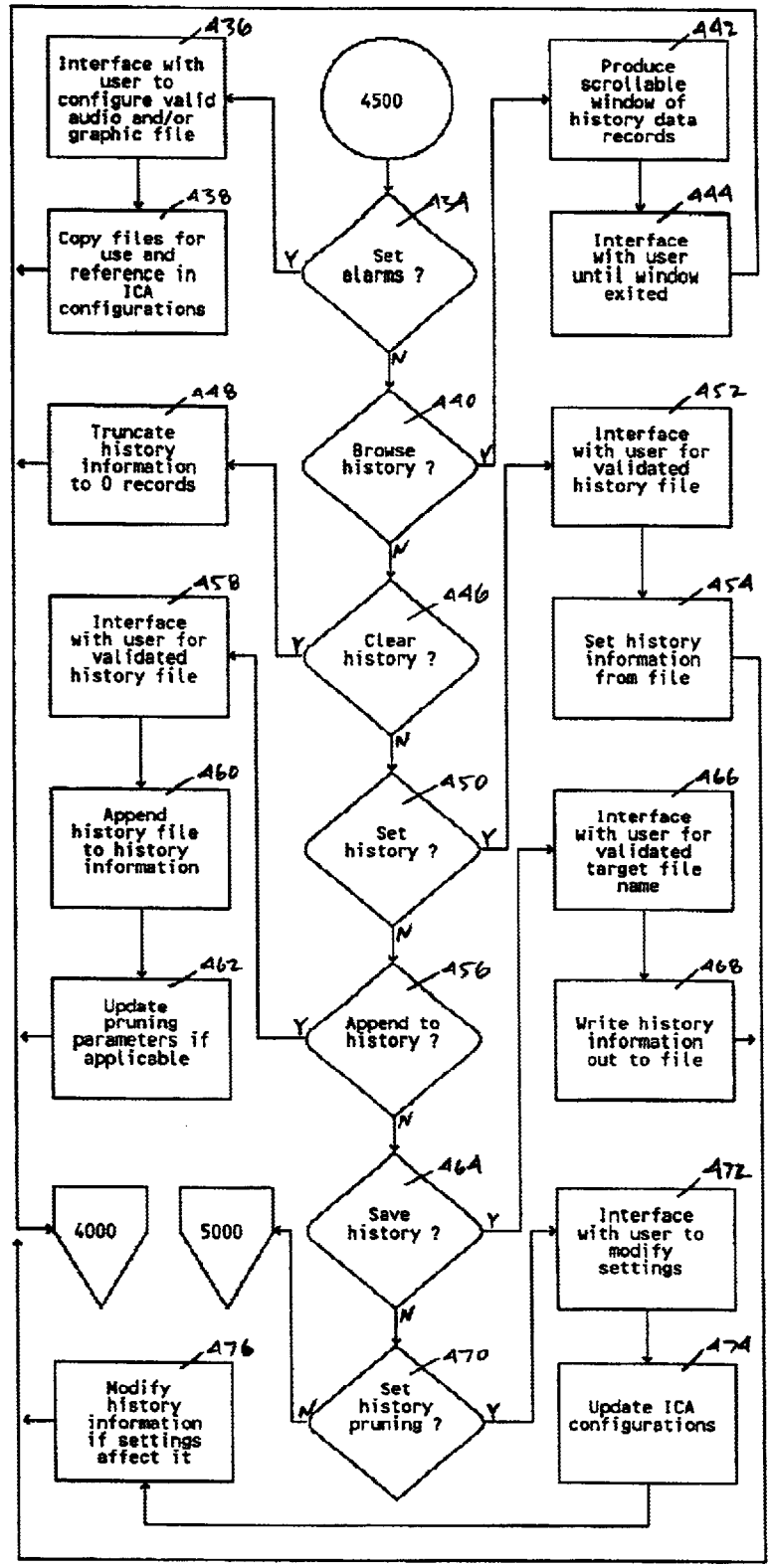

FIG. 4A and FIG. 4b depict flowcharts for describing a preferred embodiment of the data processing system use aspects of the present invention, in particular the information capture action configuration aspects. A user begins using a data processing system user interface at block 402 where processing continues to block 404. In one embodiment, the user interface of the present invention data processing system is a web browser used to navigate the internet. In other embodiments, a web server interface provides the features of the present invention. In still other embodiments, a client interface (e.g. JAVA applet) provides the features of the present invention. Other embodiments include any data processing system application, or operating system, that incorporates or integrates the present invention. Block 404 interfaces with the user until a user action appropriate for present invention discussion occurs, as handled by following blocks. When a user action relevant for discussion occurs, processing continues to block 406.

If block 406 determines that the user selected to launch ICA configuration, then block 408 accesses current ICA configurations, block 410 displays the ICA configuration window 100 with the prescribed configurations, and processing continues back to block 404. Block 408 preferably accesses a configuration file containing defaults if its the first execution of block 408. The configuration file is preferably maintained locally, for example, to hard disk drive 310. If it is not the first execution of block 408, then previously saved ICA configurations are accessed from the configuration file (set through the ICA configuration interface). Various block 410 embodiments will provide an ICA configuration interface appropriate to the particular data processing system, but containing the same semantics as those described by FIG. 1.

If block 406 determines that the user did not select to launch ICA configuration, then processing continues to block 412. If block 412 determines that the user selected to exit ICA configuration, then processing continues to block 414 where the configuration interface is terminated, for example, destroying the ICA configuration window 100. Thereafter, processing continues back to block 404.

If block 412 determines that the user did not select to exit ICA configuration, then processing continues to block 416. If block 416 determines that the user selected to set an ICA tracking variable (114a, 114b, or 114c), then block 418 highlights any radio button of the selection, block 420 updates ICA configurations preferably maintained in the configuration file, and processing continues back to block 404.

If block 416 determines that the user did not select to set an ICA tracking variable, then processing continues to block 422. If block 422 determines that the user selected to set an ICA rule (see rule column 118), then block 424 toggles to the next character of selections as described above, and processing continues to block 420. Block 422 recognizes user toggles to a rule, for example of rule box 120, and block 424 toggles the ordered candidates appropriately.

If block 422 determines that the user did not select to set an ICA rule, then processing continues to block 426. If block 426 determine s that the user selected to modify a setting of the redundancy detection processing (e.g. control group 122), then block 428 updates the checkmark(s) as described above, and processing continues to block 420.

If block 426 determines that the user did not select to modify a setting of the redundancy detection processing, then processing continues to block 430. If block 430 determines that the user selected to set the history [co]llection (e.g. setting 132), then block 432 updates the checkmark as described above, and processing continues to block 420.

If block 430 determines that the user did not select to set the history collection setting 132, then processing continues to block 434 by way of off page connector 4500. If block 434 determines that the user selected to set alarms (e.g. from the File pulldown option 102), then block 436 interfaces with the user to configure a validated audio file (or a system beep) or a validated visual file (or a system display methodology). The system defaults these appropriately so the user is not required to configure anything. The audio file is preferably a wave file. The visual (graphic) file is preferably of a .gif or .jpg type for a small region of display, or a system designated area of display, on the user interface of the data processing system. The audio file is used by processing associated with the audible alarm setting 124. The visual file is used by processing associated with the visual alarm setting 126. One embodiment may only support a system beep and system method for visual display. Another embodiment may not support alarm configuration at all (i.e. system implements methodology). Thereafter, block 438 copies any files provided by the user at block 436 to a safe location and references them appropriately in the ICA configurations. Processing then continues back to block 404 by way of off page connector 4000.

If block 434 determines that the user did not select to set alarms, then processing.,continues to block 440. If block 440 determines that the user selected to browse the RDHI, for example, by way of History pulldown option 104, then block 442 produces a scrollable window displaying the RDHI, block 444 interfaces with the user until browsing is complete, and processing continues back to block 404.

If block 440 determines that the user did not select to browse RDHI, then processing continues to block 446. If block 446 determines that the user selected to clear RDHI, then block 448 truncates RDHI to zero records and processing continues back to block 404.

If block 446 determines that the user did not select to clear RDHI, then processing continues to block 450. If block 450 determines that the user selected to set RDHI, then block 452 interfaces with the user for a validated history file, block 454 sets active RDHI to the data records 200 of the file, and processing continues back to block 404.

If block 450 determines that the user did not select to set RDHI, then processing continues to block 456. If block 456 determines that the user selected to append to RDHI, then block 458 interfaces with the user for a validated history file, block 460 appends data records 200 from the file to active RDHI, and block 462 automatically updates, if required, pruning configurations according to the ending result of the append operation. Updating the pruning configurations prevents the user from having to set pruning configurations prior to performing an append in order to prevent undesirable pruning. Thereafter, processing continues back to block 404.

If block 456 determines that the user did not select to append to RDHI, then processing continues to block 464. If block 464 determines that the user selected to save RDHI, then block 466 interfaces with the user for a validated target history file, block 468 writes active RDHI data records 200 to the file, and processing continues back to block 404.

If block 464 determines that the user did not select to save RDHI, then processing continues to block 470. If block 470 determines that the user selected to set pruning configurations, then block 472 interfaces with the user to modify settings, block 474 updates the ICA configurations (preferably maintained in the configuration file), block 476 prunes (if applicable) RDHI with the new settings, and processing continues back to block 404. Block 472 preferably allows configuring pruning of RDHI by date/time, or number of records, combinations thereof, or any reasonable pruning technique as well known to those skilled in the art.

If block 470 determines that the user did not select to configure pruning, then processing continues to block 502 by way of off page connector 5000. Blocks 430 through 432, and 446 through 468 provide the capability to set RDHI for containing ICAs previously performed in any time window of history.

Figure 5:
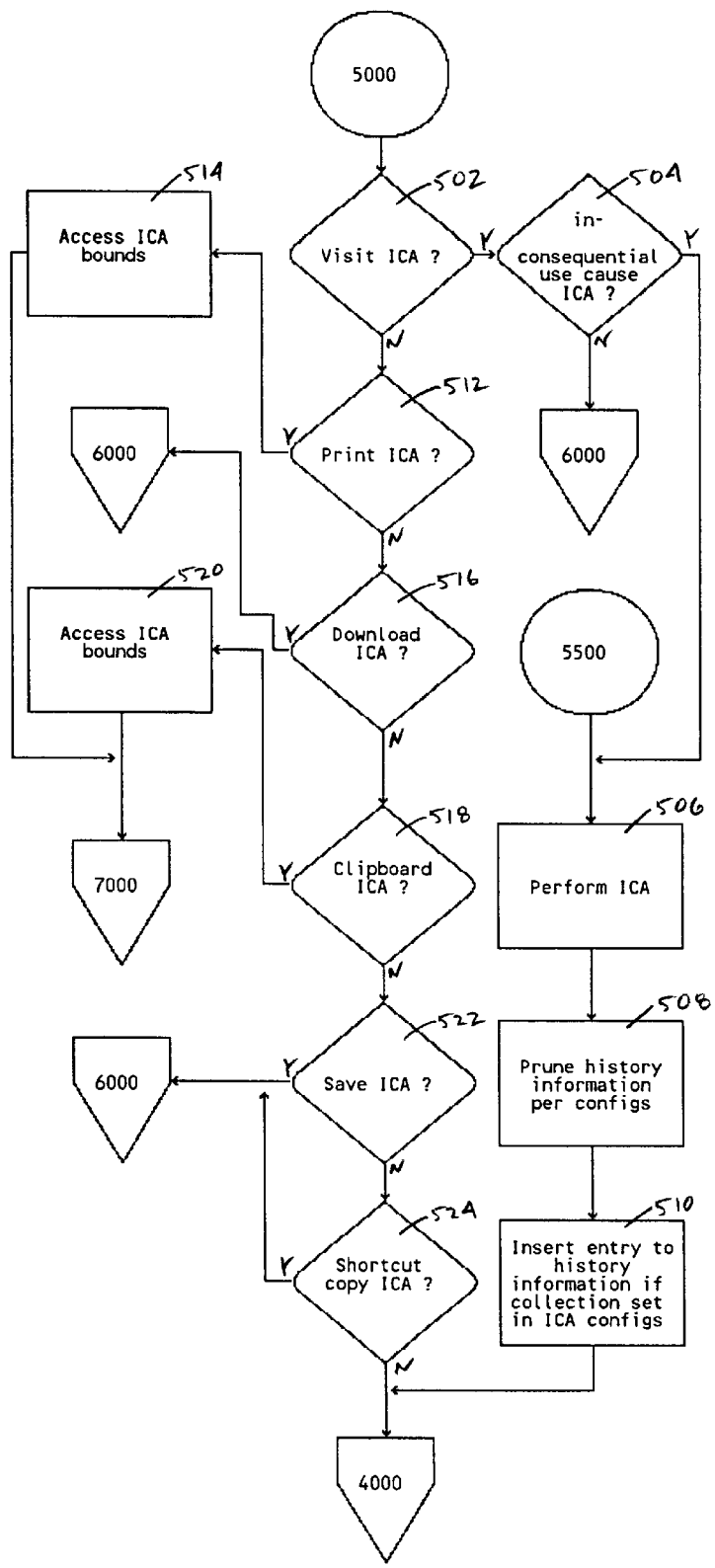
FIG. 5 depicts a flowchart for describing a preferred embodiment of the data processing system use aspects of the present invention, in particular the information capture action processing aspects.

FIG. 5 depicts a flowchart for describing a preferred embodiment of the data processing system use aspects of the present invention, in particular the information capture action processing aspects. Block 404 monitors for user invocations of ICAs as the user uses the data processing system, and FIG. 5 further determines which ICA. If block 502 determines that the user performed a visit ICA, then processing continues to block 504. A visit ICA in the embodiment described above is user invocation, for example in a web browser, to transpose to a new web site (page) address.

If block 504 determines that the user performed a visit ICA inconsequentially, for example, by use of the forward (FWD) context or backward context (BACK) invocation of the web browser, then processing flows to block 506. Performing an ICA as the result of using the web browser FWD or BACK control is an inconsequential user invocation causing the ICA, and therefore is processed as not being redundant. Block 506 performs the ICA by transposing to the user interface context (e.g. web page address transposition). Thereafter, block 508 prunes RDHI according to ICA configurations, block 510 checks the ICA configurations history collection setting 132. If the history collection setting 132 is enabled, then block 510 inserts a RDHI data record 200 to the RDHI with ICA type field 202 set to the Visit, reference field 204 set to the fully qualified web page address, bounds descriptor field 206 set to null, and date/time stamp field 208 set to the current system date/time. Processing then continues back to block 404 by way of off page connector 4000. Thus, block 510 maintains ICAs to the RDHI.

Figure 6:
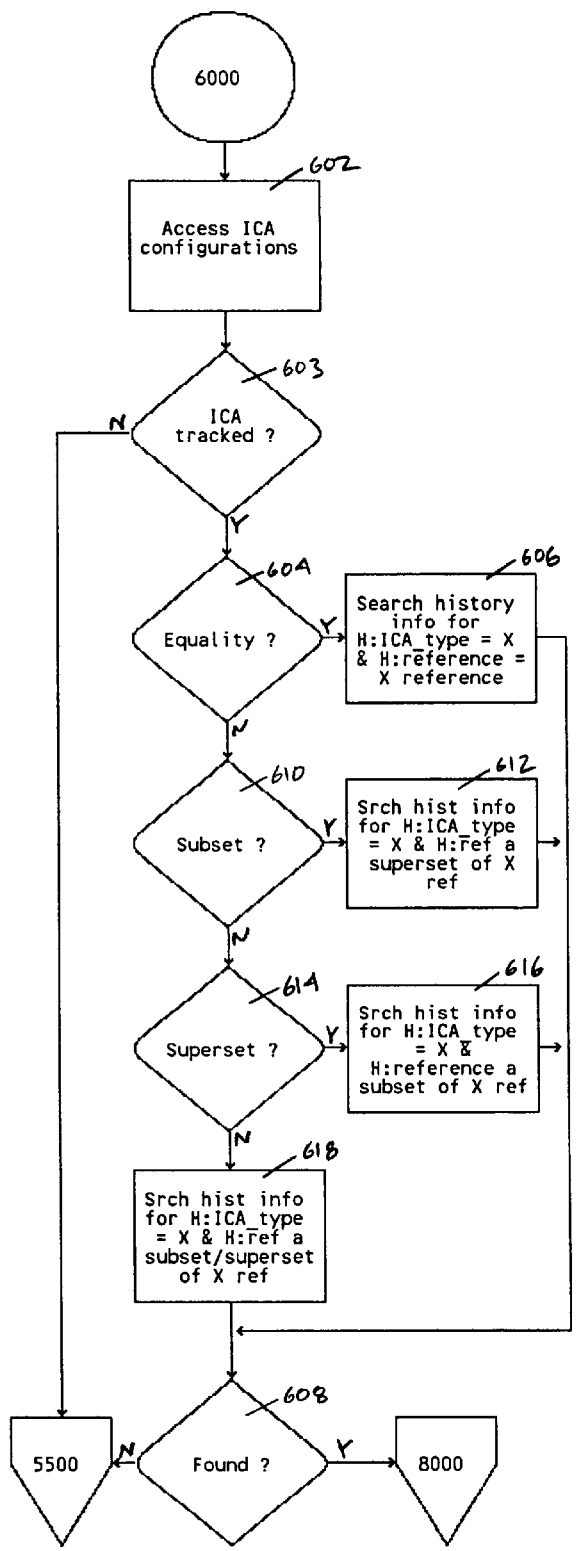
FIG. 6 depicts a flowchart for describing a preferred embodiment of the information capture action redundancy determination processing aspects of the present invention for information capture actions that do not utilize bounds descriptor information.

If block 504 determines that the visit ICA was not inconsequential, then processing continues to block 602 of FIG. 6 by way of off page connector 6000. Transposing to a web page as the result of an invoked link, manually entered web address, invoked link from transposition history or other source, or other invocations that cause transposition, are treated as an ICA. FIG. 6 processing is described below.

Figure 7:
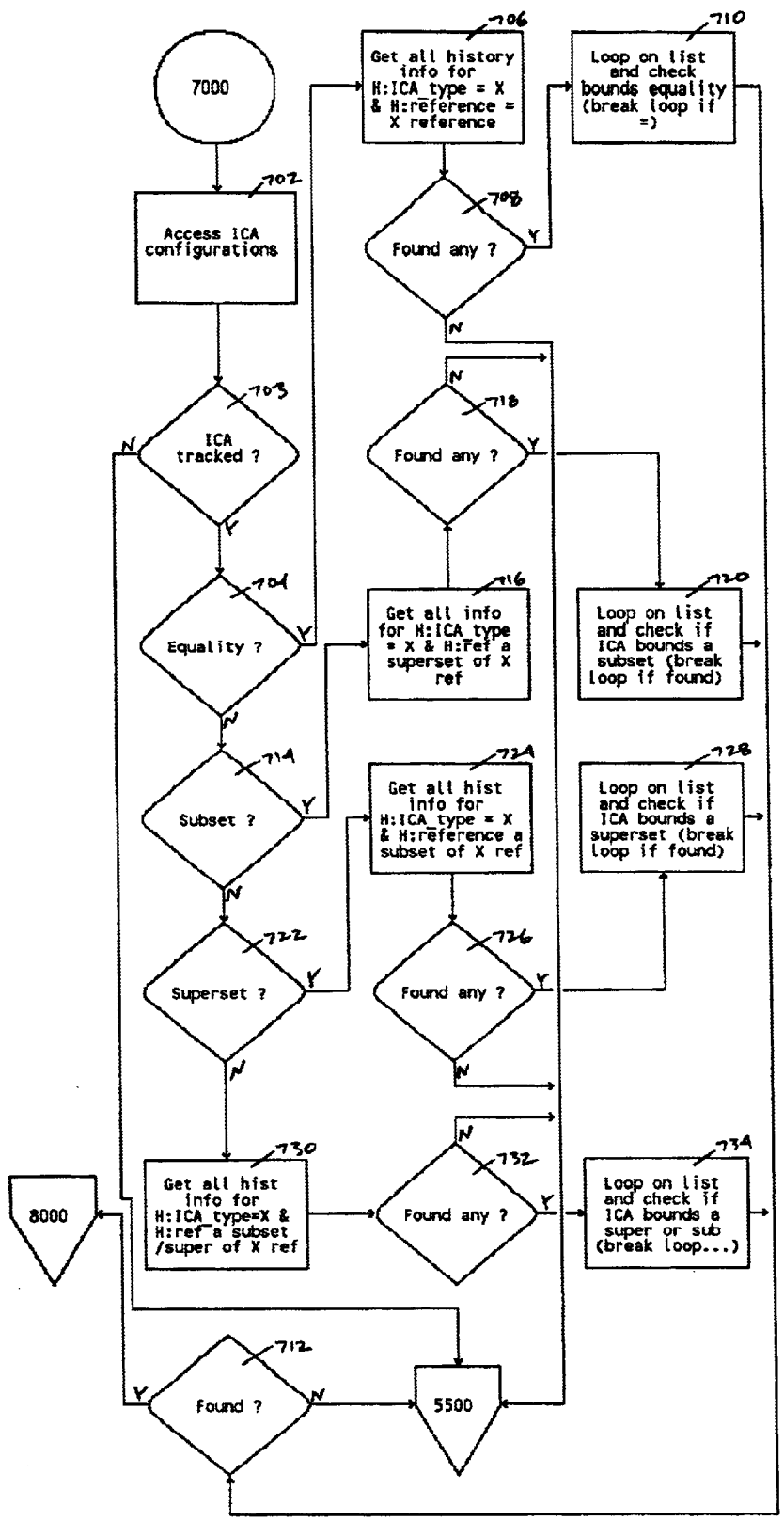
FIG. 7 depicts a flowchart for describing a preferred embodiment of the information capture action redundancy determination processing aspects of the present invention for information capture actions that utilize bounds descriptor information.

If block 502 determines that the user did not perform a visit ICA, then processing continues to block 512. If block 512 determines that the user performed a print ICA, then block 514 accesses the ICA bounds and processing continues to block 702 of FIG. 7 by way of off page, connector 7000. FIG. 7 is described below. A print ICA is performed by the user upon user invocation of actually performing a print action. All parameters of the print have already been specified at block 404 and the user performs the last action, for example, hitting the enter key to do the print. Block 512 determines the print ICA and then block 514 accesses the bounds parameters of the print which have already been specified, for example, all of the document, the page numbers, the offset and length into a selection, or the like.

If block 512 determines that the user did not perform a print ICA, then processing continues to block 516. If block 516 determines that the user performed a download ICA, then processing continues to block 602 of FIG. 6 by way of off page connector 6000. A download ICA is performed by the user upon user invocation of actually performing a download, for example from the internet. All parameters of the download have already been specified at block 404 and the user performs the last action, for example, hitting the enter key to do the download. Block 516 determines the download ICA which may have been performed, for example, as a web page interface action, a right mouse click on a downloadable content item of a web page, or the like.

If block 516 determines that the user did not perform a download ICA, then processing continues to block 518. If block 518 determines that the user performed a clipboard ICA (clipboard clip), then block 520 accesses the ICA bounds and processing continues to block 702 of FIG. 7. A clipboard ICA is performed by the user upon user invocation of actually performing a clipboard action. All parameters of the clipboard action have already been specified at block 404 and the user performs the last action, for example, selecting to do the clip. Block 518 determines the clipboard ICA and then block 520 accesses the bounds parameters of the clip which have already been specified, for example, all of a context (e.g. entire document or web page), the offset and length into a selection (e.g. html file), or the like.

If block 518 determines that the user did not perform a clipboard ICA, then processing continues to block 522. If block 522 determines that the user performed a save ICA, then processing continues to block 602 of FIG. 6 by way of off page connector 6000. A save is performed by the user upon user invocation of actually performing a save, for example from the internet. A user may right mouse click on a content item of a web page and choose to save it locally, for example, a graphic image, an animated graphic image, a text content, or any other content. All parameters of the save have already been specified at block 404 and the user performs the last action, for example, hitting the enter key to do the save. Block 522 determines the save ICA which may have been performed.

If block 522 determines that the user did not perform a save ICA, then processing continues to block 524. If block 524 determines that the user performed a shortcut copy ICA, then processing continues to block 602 of FIG. 6. A shortcut copy ICA is performed by the user upon user invocation of actually performing a shortcut copy, for example, a short cut to a web page of the internet. A user may right mouse click and conveniently create a short cut link to the web page. Any applicable parameters of the shortcut copy have already been specified at block 404 and the user performs the last action, for example, hitting the enter key to do the save to a particular folder. Block 524 determines the shortcut copy ICA which may have been performed. If block 524 determines that the user did not perform a shortcut copy ICA, then processing continues back to block 404.

Figure 8:
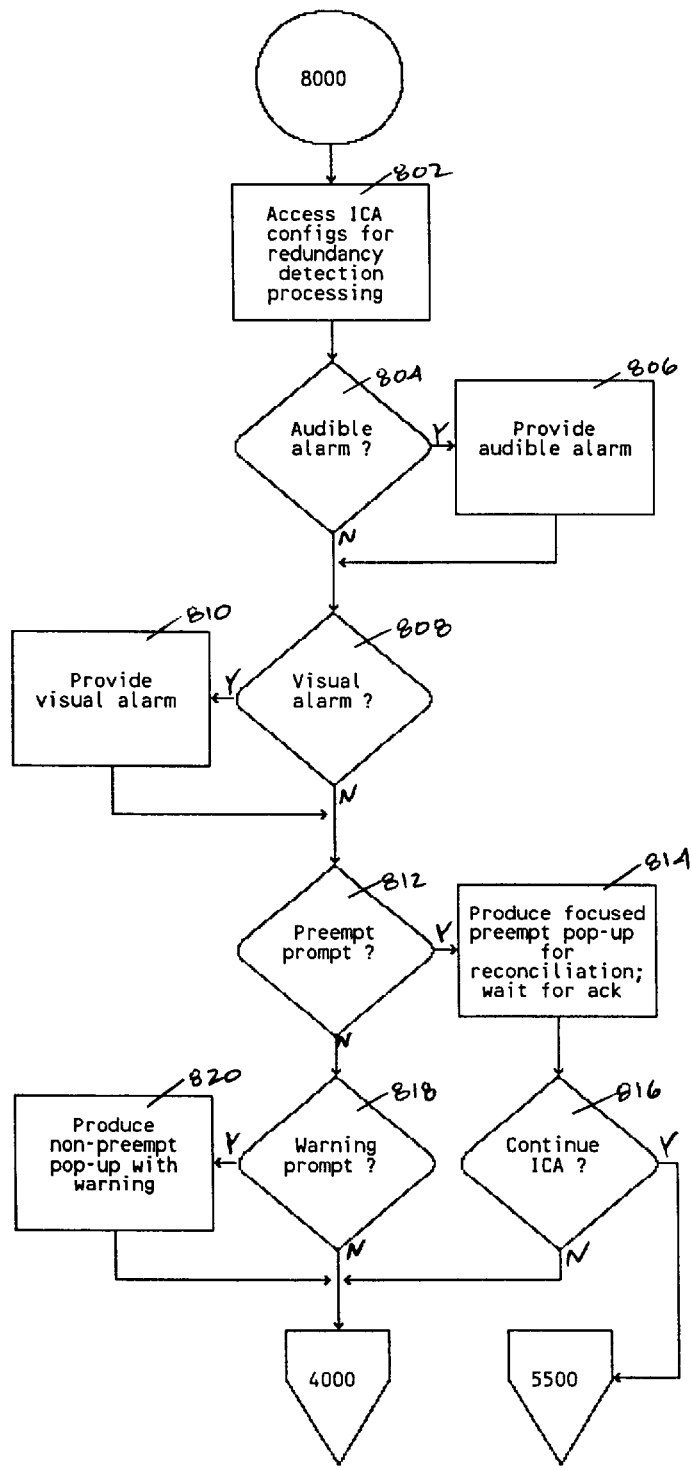
FIG. 8 depicts a flowchart for describing a preferred embodiment of the redundancy detection processing aspects of the present invention when redundancy has been determined for an information capture action.

FIG. 6 depicts a flowchart for describing a preferred embodiment of the information capture action redundancy determination processing aspects of the present invention for information capture actions that do not utilize bounds descriptor information. Block 602 accesses ICA configurations for ICA tracking variables, and the particular ICA rule (i.e. rule for ICA type) that caused execution of FIG. 6 (e.g. visit, download, save, or shortcut copy), and processing continues to block 603. If block 603 determines that the ICA that caused execution of FIG. 6 is being tracked, then processing continues to block 604. If block 604 determines that the rule is set to equality, then block 606 searches RDHI for a data record 200 containing the ICA type field of the ICA processed by FIG. 6, and a reference field 204 set to the reference of the ICA processed by FIG. 6. Thereafter, if block 608 determines that a matching data record was found, then processing continues to block 802 of FIG. 8 by way of off page connector 8000. FIG. 8 processing is discussed below. If block 608 determines that there was not a matching data record found, then processing continues to block 506 of FIG. 5 by way of off page connector 5500. Block 506 performs the ICA; visiting the user interface context if a visit ICA, downloading the file if a download ICA, saving the file if a save ICA, or copying the shortcut if a shortcut copy ICA. Thereafter, block 508 prunes RDHI according to ICA configurations, and block 510 inserts (if collect history setting 132 enabled) a RDHI data record 200 to the RDHI with the ICA type field 202 set appropriately (e.g. visit, download, save, or shortcut copy), reference field 204 set appropriately (e.g. fully qualified user interface context path if a visit, fully qualified file path name if a download or save, fully qualified user interface context if a shortcut copy), bounds descriptor field 206 set to null, and date/time stamp field 208 set to the current system date/time. Processing then continues back to block 404. If block 603 determines that the ICA causing FIG. 6 processing is not being tracked, then processing continues to block 506.

Returning now to block 604, if it is determined that the equality rule is not set for the ICA causing FIG. 6 processing, then processing continues to block 610. If block 610 determines that the ICA rule is set to subset, then block 612 searches RDHI for a data record 200 containing the ICA type field of the ICA processed by FIG. 6, and a reference field 204 that is a superset to the reference of the ICA processed by FIG. 6. For example, a reference that is a superset is an equivalent string to, or contains the scope of, the ICA reference. For example, "http://www.domainx.com/webdir1/" is a superset to "http://www.domainx.com/webdir1/webdir2.howdy.html" because it has a broader scope of the more detailed reference (detailed reference is within the superset's scope). Thereafter, if block 608 determines a data record was found, then processing continues to block 802. If block 608 determines that there was not a data record found, then processing continues to block 506.

Returning now to block 610, if it is determined that the subset rule is not set for the ICA causing FIG. 6 processing, then processing continues to block 614. If block 614 determines that the ICA rule is set to superset, then block 616 searches RDHI for a data record 200 containing the ICA type field of the ICA processed by FIG. 6, and a reference field 204 that is a subset to the reference of the ICA processed by FIG. 6. For example, a reference that is a subset is an equivalent string to, or within the scope of, the ICA reference. For example, "http://www.domainx.com/webdir1/webdir2/howdy.html" is a subset of "http://www.domainx.com/webdir1/" because its within the scope of the broader reference. Thereafter if block 608 determines a data record was found, then processing continues to block 802. If block 608 determines that there was not a data record found, then processing continues to block 506.

Returning now to block 614, if it is determined that the subset rule is not set for the ICA causing FIG. 6 processing, then processing continues to block 618 where the rule must be a both rule (i.e. superset or subset). Block 618 searches RDHI for a data record 200 containing the ICA type field of the ICA processed by FIG. 6, and a reference field 204 that is a subset, or superset, to the reference of the ICA processed by FIG. 6. Thereafter, if block 608 determines a data record was found, then processing continues to block 802. If block 608 determines that there was not a data record found, then processing continues to block 506. Thus, blocks 606, 612, 616, and 618 perform matching of the ICA (that caused FIG. 6 processing) against the RDHI (for presence of previously performed ICAs) to determine if the ICA is redundant. Block 603 enables monitoring ICAs according to configurable tracking variables.

FIG. 7 depicts a flowchart for describing a preferred embodiment of the information capture action redundancy determination processing aspects of the present invention for information capture actions that utilize bounds descriptor information. Block 702 accesses ICA configurations for ICA tracking variables 114, and the particular ICA rule (i.e. rule for ICA type) that caused execution of FIG. 7 (e.g. print, clipboard), and processing continues to block 703. If block 703 determines that the ICA that caused FIG. 7 processing is being tracked, then processing continues to block 704. If block 704 determines that the rule is set to equality, then block 706 retrieves all RDHI data records 200,containing the ICA type field of the ICA processed by FIG. 7, and a reference field 204 set to the reference of the ICA processed by FIG. 7. Thereafter, if block 708 determines that one or more data records were found, then block 710 loops on the list of data records 200, specifically the bounds descriptor field 206, to check for equivalence of bounds descriptor information between the ICA processed by FIG. 7 and a previously performed ICA in a loop iteration. Loop processing completes as soon as a match is found, or if the list search is exhausted. Thereafter, if block 712 determines that a matching data record was found, then processing continues to block 802 of FIG. 8 by way of off page connector 8000. FIG. 8 processing is discussed below. If block 712 determines that there was not a matching data record found, then processing continues to block 506 of FIG. 5 by way of off page connector 5500. Block 506 performs the ICA; printing if a print ICA, clipping if a clip ICA. Thereafter, block 508 prunes RDHI according to ICA configurations, and block 510 inserts (if collect history setting 132 enabled) a RDHI data record 200 to the RDHI with the ICA type field 202 set appropriately (e.g. print or clip), reference field 204 set appropriately (e.g. fully qualified document path name if a document to print, fully qualified user interface context (e.g. web page address) if a print, etc., or fully qualified user interface context (e.g. web page address) if a clip), bounds descriptor field 206 set to any applicable bounds information, and date/time stamp field 208 set to the current system date/time. For example, bounds information includes which print pages, which offset and length of print source, which offset and length of clipped source, or the like. Processing then continues back to block 404. If block 708 determines that no data records 200 were found, then processing continues to block 506. If block 703 determines that the ICA causing FIG. 7 processing is not being tracked, then processing continues to block 506.

Returning now to block 704, if it is determined that the equality rule is not set for the ICA causing FIG. 7 processing, then processing continues to block 714. If block 714 determines that the ICA rule is set to subset, then block 716 retrieves all RDHI data records 200 containing the ICA type field of the ICA processed by FIG. 7, and a reference field 204 that is a superset to the reference of the ICA processed by FIG. 7. Thereafter, if block 718 determines that one or more data records were found, then block 720 loops on the list of data records 200, specifically the bounds descriptor field 206, to check for a superset of bounds descriptor information in the RDHI data record when compared to the ICA processed by FIG. 7. Loop processing completes as soon as a superset is found, or if the list search is exhausted. Bounds descriptor information that is a superset is an equivalent setting, or contains (has broader scope to) the setting, of the ICA bounds descriptor. For example, "pages 8 to 12" is a superset of "pages 9 to 12". Thereafter, if block 712 determines that a data record was found, then processing continues to block 802. If block 712 determines that there was not a data record found, then processing continues to block 506. If block 718 determines that no data records 200 were found, then processing continues to block 506.

Returning now to block 714, if it is determined that the subset rule is not set for the ICA causing FIG. 7 processing, then processing continues to block 722. If block 722 determines that the ICA rule is set to superset, then block 724 retrieves all RDHI data records 200 containing the ICA type field of the ICA processed by FIG. 7, and a reference field 204 that is a subset to the reference of the ICA :processed by FIG. 7. Thereafter, if block 726 determines that one or more data records were found, then block 728 loops on the list of data records 200, specifically the bounds descriptor field 206, to check for a subset of bounds descriptor information in the RDHI data record when compared to the ICA processed by FIG. 7. Loop processing completes as soon as a subset is found, or if the list search is exhausted. Bounds descriptor information that is a subset is an equivalent setting to, or contains a narrower scope of, the setting of the ICA bounds descriptor. For example, "offset byte 58 with a clipped length of 784 bytes" is a subset of "offset byte 2 with a clipped length of 2036 bytes". Thereafter, if block 712 determines that a data record was found, then processing continues to block 802. If block 712 determines that there was not a data record found, then processing continues to block 506. If block 726 determines that no data records 200 were found, then processing continues to block 506.

Returning now to block 722, if it is determined that the superset rule is not set for the ICA causing FIG. 7 processing, then processing continues to block 730 where the rule must be a both rule (i.e. superset or subset). Block 730 retrieves all RDHI data records 200 containing the ICA type field of the ICA processed by FIG. 7, and a reference field 204 that is a subset, or superset, to the reference of the ICA processed by FIG. 7. Thereafter, if block 732 determines that one or more data records were found, then block 734 loops on the list of data records 200, specifically the bounds descriptor field 206, to check for a subset, or superset, of bounds descriptor information in the RDHI data record when compared to the ICA processed by FIG. 7. Loop processing completes as soon as a subset, or superset, is found, or if the list search is exhausted. Thereafter, if block 712 determines that a data record was found, then processing continues to block 802. If block 712 determines that there was not a data record found, then processing continues to block 506. If block 732 determines that no data records 200 were found, then processing continues to block 506.

Thus, blocks 706, 710, 716, 720, 724, 728, 730, and 734 perform matching of the ICA (that caused FIG. 7 processing)

against the RDHI (for presence of previously performed ICAs) to determine if the ICA is redundant. Block 703 enables monitoring ICAs according to configurable tracking variables.

Block 506 performs all processing associated with the ICA. Any data that is created as the result of the ICA is completely processed at block 506. For example, a print action may produce a spooled file, a print tracking record accessed by various print support programs, or other data that is directly a result of the ICA. Likewise, a save ICA or download ICA may update a log in addition to placing data to a specified location. Any ICA may cause data to be created at block 506 that is directly a result of the ICA. Blocks 508 and 510 operate outside of ICA processing. The RDHI is a separate entity maintained for solely determining redundancy of ICAs. RDHI is similar to prior art in that it is automatically pruned at block 508 in accordance with user configurations. An alternative embodiment to the present invention could integrate RDHI with prior art history information, for example of the Microsoft Internet Explorer.

FIG. 8 depicts a flowchart for describing a preferred embodiment of the redundancy detection processing aspects of the present invention when redundancy has been determined for an information capture action. FIG. 8 provides an alert when the ICA is redundant. Block 802 accesses ICA configurations, for redundancy processing, and processing continues to block 804. If block 804 determines that an audible alarm is configured (i.e. checkmark at audible alarm setting 124), then block 806 plays the configured audio file (or just a system beep). Processing continues to block 808. If block. 804 determines that an audible alarm option was not specified, then processing continues to block 808.

If block 808 determines that a visual alarm is configured (i.e. checkmark at visual alarm setting 126), then block 810 presents the visual file (or just a system method for the visual alarm). Processing continues to block 812. If block 808 determines that a visual alarm option was not specified, then processing continues to block 812. The visual alarm may be presented by block 810 to a well known area of the user interface, or in a sub-area (e.g. window) as is appropriate for the embodiment. The visual alarm may be presented dynamically based on active user interface objects (e.g. windows) and their positions at the time of doing visual alarm presentation. Block 810 may also present the visual alarm for a configured time period, for example, when doing a dynamic presentation based on the current user interface state so as to ensure visibility of the alarm.

If block 812 determines that a preempt prompt is configured (i.e. checkmark at preempt option 130), then block 814 displays a pop-up prompt requiring user reconciliation (e.g. pop-up window requiring an answer to CANCEL ICA or DO THE ICA). The prompt preferably contains a message stating the current ICA is redundant, and does the user really want to do it. The preempt prompt also prevents any other data processing system use until the user responds to the prompt. Thereafter, block 816 continues only when the user responds. If block 816 determines that the user selected to continue with performing the ICA, then processing continues to block 506 by way of off page connector 5500. If block 816 determines that the user selected to cancel the ICA, then processing continues back to block 404 by way of off page connector 4000.

Referring back to block 812, if it is determined that a preempt prompt option was not configured, then processing continues to block 818. If block 818 determines that a warning prompt was configured without the preempt option (i.e. checkmark at warning prompt setting 128 but not at preempt option 130), then block 820 displays a pop-up prompt preferably containing a warning message stating the current ICA is redundant. The warning prompt (e.g. pop-up window) can be removed whenever the user wants to remove it. Thereafter, processing continues back to block 404. Thus, FIG. 8 automatically cancels the ICA except when a preempt prompt is presented to the user and the user responds for continuing with performing the ICA. Both prompts presented at blocks 814 and 820 require user action before leaving the user interface.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method in a data processing system for enabling a user to prevent redundant capture of information, said method comprising the steps of:

maintaining, for said data processing system, information capture action configurations for variably determining how to process an information capture action;

maintaining for said data processing system a collection of historical records wherein each historical record of said historical records contains a type field and reference field, said type field describing the type of a previously performed information capture action, said reference field contextually describing said previously performed information capture action;

recognizing a user invocation for a current information capture action in accordance with said information capture action configurations;

determining for said current information capture action, upon recognition of said user invocation, a current type and a current reference, said current type describing the type of said current information capture action, said current reference contextually describing said current information capture action;

searching said collection of historical records for a matching record wherein said matching record contains a type field that matches said current type and a reference field that matches said current reference; and providing an alert to said user if said matching record is found, said alert presented to said user in accordance with said information capture action configurations.

2. The method of claim 1 wherein said step of providing an alert further includes the step of automatically canceling said current information capture action.

3. The method of claim 1 wherein said step of providing an alert comprises the step of providing a warning prompt, said warning prompt requiring user action before leaving the user interface.

4. The method of claim 1 further comprising the step of automatically maintaining said current information capture action to said collection of historical records.

5. The method of claim 1 wherein said collection of historical records is user configurable for containing information capture actions previously performed in any time window.

6. The method of claim 1 wherein said step of searching said collection of historical records for a matching record comprises the step of searching said collection of historical records for a matching record wherein said matching record contains a type field that matches said current type and a reference field that is a subset of said current reference.

7. The method of claim 1 wherein said step of searching said collection of historical records for a matching record comprises the step of searching said collection of historical records for a matching record wherein said matching record contains a type field that matches said current type and a reference field that is a superset of said current reference.

8. The method of claim 1 wherein said step of recognizing a user invocation for a current information capture action further includes the step of recognizing that said current information capture action is not redundant when an inconsequential user invocation causes said current information capture action.

9. A data processing system for enabling a user to prevent redundant capture of information, said data processing system comprising:

means for maintaining, for said data processing system, information capture action configurations for variably determining how to process an information capture action;

means for maintaining for said data processing system a collection of historical records wherein each historical record of said historical records contains a type field and reference field, said type field describing the type of a previously performed information capture action, said reference field contextually describing said previously performed information capture action;

means for recognizing a user invocation for a current information capture action in accordance with said information capture action configurations;

means for determining for said current information capture action, upon recognition of said user invocation, a current type and a current reference, said current type describing the type of said current information capture action, said current reference contextually describing said current information capture action;

means for searching said collection of historical records for a matching record wherein said matching record contains a type field that matches said current type and a reference field that matches said current reference; and means for providing an alert to said user if said matching record is found said alert presented to said user in accordance with said information capture action configurations.

10. The system of claim 9 wherein said means for providing an alert further includes means for automatically canceling said current information capture action.

11. The system of claim 9 wherein said means for providing an alert comprises means for providing a warning prompt, said warning prompt requiring user action before leaving the user interface.

12. The system of claim 9 further comprising means for automatically maintaining said current information capture action to said collection of historical records.

13. The system of claim 9 wherein said collection of historical records is user configurable for containing information capture actions previously performed in any time window.

14. The system of claim 1 wherein said means for searching said collection of historical records for a matching record comprises means for searching said collection of historical records for a matching record wherein said matching record contains a type field that matches said current type and a reference field that is a subset of said current reference.

15. The system of claim 1 wherein said means for searching said collection of historical records for a matching record comprises means for searching said collection of historical records for a matching record wherein said matching record contains a type field that matches said current type and a reference field that is a superset of said current reference.

16. The system of claim 1 wherein said means for recognizing a user invocation for a current information capture action further includes means for recognizing that said current information capture action is not redundant when an inconsequential user invocation causes said current information capture action.

17. A data processing system for enabling a user to prevent redundant printing of information, said data processing system comprising:

means for maintaining, for said data processing system, configurations for variably determining how to process a print request action;

means for maintaining for said data processing system a collection of historical records wherein each historical record of said historical records contains at least a print reference field for contextually describing what was previously printed;

means for recognizing a user invocation for a current print request action in accordance with said configurations;

means for determining for said current print request action, upon recognition of said user invocation, a current reference, said current reference contextually describing what will be printed by said current print request action;

means for searching said collection of historical records for a matching record wherein said matching record contains a print reference field that matches said current reference; and means for providing an alert to said user if said matching record is found, said alert presented to said user in accordance with said configurations.

* * * * *